United States Patent
Tanaka et al.

(10) Patent No.: US 7,517,025 B2
(45) Date of Patent: Apr. 14, 2009

(54) SEAT BELT RETRACTOR AND A SEAT BELT DEVICE

(75) Inventors: Koji Tanaka, Moriyama (JP); Masato Takao, Hikone (JP); Koji Inuzuka, Echi-gun (JP)

(73) Assignee: Takata Corporation, Tokyo (JP)

( * ) Notice: Subject to any disclaimer, the term of this patent is extended or adjusted under 35 U.S.C. 154(b) by 118 days.

(21) Appl. No.: 11/230,543

(22) Filed: Sep. 21, 2005

(65) Prior Publication Data
US 2006/0071537 A1 Apr. 6, 2006

(30) Foreign Application Priority Data
Oct. 5, 2004 (JP) ............... 2004-292048

(51) Int. Cl.
*B60R 22/34* (2006.01)
*B60R 22/44* (2006.01)
*B60R 22/48* (2006.01)

(52) U.S. Cl. ................... 297/477; 242/373
(58) Field of Classification Search ............... 297/477; 242/373
See application file for complete search history.

(56) References Cited

U.S. PATENT DOCUMENTS

| | | | | |
|---|---|---|---|---|
| 4,637,630 | A * | 1/1987 | Nishimura et al. | 280/807 |
| 4,669,680 | A | 6/1987 | Nishimura et al. | |
| 4,787,569 | A | 11/1988 | Kanada et al. | |
| 5,611,497 | A * | 3/1997 | Krambeck et al. | 242/375.1 |
| 5,794,876 | A * | 8/1998 | Morizane et al. | 242/374 |
| 6,318,662 | B1 * | 11/2001 | Hori et al. | 242/374 |
| 6,343,759 | B1 * | 2/2002 | Specht | 297/477 X |
| 6,494,395 | B1 * | 12/2002 | Fujii et al. | 242/374 |
| 6,575,394 | B1 | 6/2003 | Fujita et al. | |
| 6,598,821 | B2 * | 7/2003 | Specht | 242/374 |
| 6,729,650 | B2 | 5/2004 | Midorikawa et al. | |
| 6,848,717 | B2 * | 2/2005 | Bullinger et al. | 297/477 X |
| 6,966,518 | B2 * | 11/2005 | Kohlndorfer et al. | 242/374 |
| 7,140,571 | B2 * | 11/2006 | Hishon et al. | 242/390.8 |
| 2002/0060261 | A1 * | 5/2002 | Kameyoshi et al. | 242/374 |
| 2003/0116669 | A1 * | 6/2003 | Fujii et al. | 242/383 |
| 2003/0178836 | A1 * | 9/2003 | Viano et al. | 242/374 X |
| 2004/0021029 | A1 * | 2/2004 | Eberle et al. | 242/374 X |

(Continued)

FOREIGN PATENT DOCUMENTS

GB 2 335 890 A 10/1999

(Continued)

*Primary Examiner*—Rodney B. White
(74) *Attorney, Agent, or Firm*—Foley & Lardner LLP

(57) ABSTRACT

As an occupant releases the latching between a buckle and a tongue, a seat belt retractor winds up the seat belt at a winding-up speed S1 as a first high speed. Accordingly, the seat belt moves away from the occupant immediately. As a time period (T1-T0) elapses from the buckle release, the seat belt retractor winds up the seat belt at a winding-up speed S2 as a low speed. Accordingly, the seat belt is slowly wound up so that the tongue is less likely to strike and thus scratch an interior panel. As a time period (T2-T1) further elapses, the seat belt retractor winds up the seat belt at a winding-up speed S3 as a second high speed. Accordingly, the winding of the seat belt is promptly completed so that the seat belt is less likely to be caught by a door when the occupant gets out of the vehicle.

16 Claims, 2 Drawing Sheets

U.S. PATENT DOCUMENTS

| | | | |
|---|---|---|---|
| 2005/0011980 A1* | 1/2005 | Prokscha et al. | 242/374 |
| 2005/0184185 A1* | 8/2005 | Holbein et al. | 242/374 |
| 2006/0091251 A1* | 5/2006 | Nomura | 242/374 |
| 2006/0097098 A1* | 5/2006 | Nomura | 242/374 |
| 2006/0097099 A1* | 5/2006 | Nomura | 242/374 |
| 2006/0113418 A1* | 6/2006 | Nomura | 242/374 |
| 2006/0113419 A1* | 6/2006 | Nomura | 242/374 |
| 2006/0113420 A1* | 6/2006 | Nomura | 242/374 |
| 2006/0118674 A1* | 6/2006 | Nomura | 242/374 |
| 2006/0175453 A1* | 8/2006 | Takao et al. | 242/374 |
| 2006/0220368 A1* | 10/2006 | Takao et al. | 297/477 X |
| 2007/0029128 A1* | 2/2007 | Takao et al. | 242/374 X |
| 2007/0029772 A1* | 2/2007 | Takao et al. | 242/374 X |
| 2007/0084955 A1* | 4/2007 | Tanaka et al. | 242/374 |
| 2007/0144810 A1* | 6/2007 | Tanaka et al. | 242/374 X |
| 2007/0144811 A1* | 6/2007 | Tanaka et al. | 242/374 X |

FOREIGN PATENT DOCUMENTS

| | | |
|---|---|---|
| JP | 11-301407 | 11/1999 |
| JP | 11-334533 | 12/1999 |
| JP | 2001-225720 | 8/2001 |
| JP | 2001-334913 | 12/2001 |

* cited by examiner

SEAT BELT RETRACTOR AND A SEAT BELT DEVICE

BACKGROUND

The present invention relates to a seat belt retractor having a function of winding up a seat belt by means of a motor and to a seat belt device having the same.

FIG. 3 schematically shows a seat belt device installed in an automobile or the like. A seat belt (sometimes called "webbing") 1 has one end fixed to a side anchor 2 attached to a vehicle floor and the other end wound up by a seat belt retractor 4 through a deflection fitting 3 attached to a vehicle pillar. Though the deflection fitting 3 and the seat belt retractor 4 are generally hidden by the interior panel for the vehicle pillar so that these are normally not seen from the vehicle cabin, these are illustrated as being seen from the vehicle cabin in FIG. 3 for convenience of explanation. The seat belt 1 is provided with tongue 9.

There is another side anchor 5 attached to the vehicle floor to which a strip 6 is attached. Attached to an end of the strip 6 is a buckle 7. After an occupant sits on a seat 8, the tongue 9 is pulled to withdraw the seat belt 1 from the seat belt retractor 4 and to extend the seat belt 1 across the front of the occupant's body and is latched to the buckle 7. As an occupant's hands are then released from the tongue 9 and the buckle 7, the seat belt 1 is wound up by the action of the seat belt retractor 4 such that the seat belt 1 fits the occupant's body.

As mentioned above, the seat belt retractor 4 has a function of taking up a part of the seat belt which is excessively withdrawn when the tongue 9 is latched to the buckle 7 after the occupant sits and withdraws the seat belt 1. To achieve this function, a return spring is used in the conventional seat belt retractor 4. For wearing the seat belt 1, an occupant withdraws the seat belt 1 against the biasing force of the return spring and releases his or her hand from the tongue 9 after latching the tongue 9 to the buckle 7. By the force of the return spring, the part of the seat belt 1 which is excessively withdrawn is thus retracted by the seat belt retractor 4 until the seat belt fits the occupant's body.

As mentioned above, a seat belt retractor is required to satisfy both the following: (1) to securely wind up an excessively withdrawn seat belt until the seat belt fits the occupant's body or, in case that nobody wears the seat belt, to wind up the withdrawn seat belt until the seat belt is securely housed in a housing, and (2) not to impart unnecessary tightness on an occupant's chest normally wearing the seat belt.

In the case of a seat belt retractor utilizing a biasing force of a single return spring, however, when a spring having a weak biasing force is employed as the return spring in order to reduce the pressure to the chest of the occupant during wearing, the biasing force for winding up the belt (for housing the belt) must be poor so that the operationability and the retractability are deteriorated. On the other hand, when a spring having a strong biasing force is employed as the return spring in order to provide sufficient biasing force for winding up the seat belt, there is a problem of increased tightness in chest of an occupant even when normally wearing the seat belt.

In addition, in the conventional seat belt retractor having a built-in single return spring, there is also a problem that the biasing force of the return spring is increased as the withdrawn amount of the seat belt is increased so that increased withdrawing force is required as the withdrawn amount is increased.

As a seat belt retractor capable of solving the aforementioned problems, a seat belt retractor which can wind up a seat belt by a motor or a combination of a motor and a return spring is disclosed, for example, in Japanese Patent Unexamined Publication No. 2001-225720 (incorporated by reference herein in its entirety). Such a seat belt retractor having a mechanism of winding up a seat belt utilizing a motor is also described in Japanese Patent Unexamined Publication No. H11-301407 and Japanese Patent Unexamined Publication No. H11-334533 (both of which are incorporated by reference herein in their entirety).

SUMMARY

According to a first embodiment of the present invention, a seat belt retractor is provided. The seat belt retractor has a function of winding up a seat belt by a motor. A speed of winding up the seat belt after the release of latching between a buckle and a tongue on the seat belt is varied.

According to a second embodiment of the present invention, a seat belt system is provided. The seat belt system comprises a seat belt, a tongue attached to the seat belt, a buckle configured to releasably latch with the tongue, and a seat belt retractor with a motor configured to enable a winding up process of the seat belt. The motor is configured to wind up the seat belt after unlatching of the tongue and the buckle. A speed of the motor is configured to vary between a first high speed, a low speed, and a second high speed.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 3 is an illustration schematically showing a seat belt device installed in an automobile or the like.

DETAILED DESCRIPTION

Figure 1:
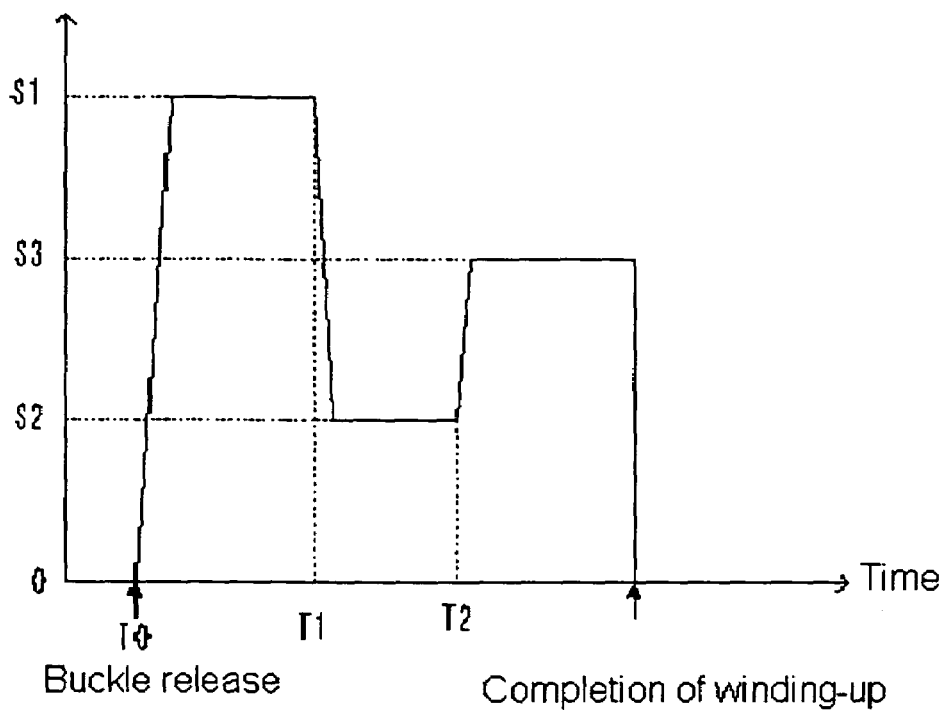
FIG. 1 is a chart showing changes in speed of winding up a seat belt in a seat belt retractor as a first embodiment of the present invention.

In the conventional seat belt retractor utilizing a motor, the speed of winding up the seat belt by the motor is maintained constant (the voltage applied to the motor is maintained constant). However, this conventional method has the following problems.

That is, in the case of too slow of speed in winding up the seat belt, it takes too much time to wind up the seat belt after the occupant takes off the seat belt. Therefore, the unwound seat belt sometimes disturbs the occupant when getting out of the vehicle. Further, there is also a problem that the seat belt is caught by a door because the winding of the seat belt is not completed until the occupant closes the door after getting out of the vehicle.

On the other hand, in the case of too fast of speed in winding up the seat belt, the tongue on the seat belt, which is rapidly wound up, may strike and thus scratch an interior panel or generate noise.

Embodiments of the present invention were made under the circumstances and an object of the present invention is to provide a seat belt retractor in which the seat belt is less likely to disturb an occupant due to uncompleted winding of the seat belt when the occupant gets out of the vehicle, the seat belt is less likely to be caught by a door when the occupant closes the door after getting out of the vehicle, and the tongue is less likely to scratch an interior panel and less likely to generate noise. Another object of embodiments of the present invention is also to provide a seat belt device or system having such a seat belt retractor.

A first embodiment for solving the aforementioned problems is a seat belt retractor having a function of winding up a seat belt by a motor, and is characterized in that the speed of winding up the seat belt after the release of latching between the buckle and the tongue on the seat belt is allowed to be varied.

According to this embodiment, since the speed of winding up the seat belt after the release of latching between a buckle and a tongue on the seat belt by an occupant is allowed to be varied by a user, flexible control can be conducted.

A second embodiment for solving the aforementioned problems is the first embodiment and is characterized in that the speed of winding up the seat belt is variable according to the time period elapsing from the release of latching between the buckle and the tongue on the seat belt.

According to this embodiment, since the speed of winding up the seat belt is varied according to the time period elapsing from the release of latching between the buckle and the tongue on the seat belt by an occupant, the seat belt can be wound up at a proper speed according to the amount the seat belt is wound.

A third embodiment for solving the aforementioned problems is the second embodiment and is characterized in that the seat belt is wound up at a first high speed until a first predetermined time period elapses from the release of latching between the buckle and the tongue on the belt, the seat belt is wound up at a low speed until a second predetermined time period elapses after the first predetermined time period, and the seat belt is wound up at a second high speed until the winding of the seat belt is completed after the second predetermined time period.

According to this embodiment, since the seat belt is wound up at a first high speed until the first predetermined time period elapses from the release of latching between the buckle and the tongue on the seat belt, the seat belt immediately moves away from the occupant's body to allow the movement of the occupant. Since the seat belt is wound up at the low speed until the second predetermined time period elapses after the first predetermined time period, the seat belt is wound up slowly, the tongue is less likely to rapidly strike and thus scratch an interior panel and is less likely to generate noise. Since the seat belt is wound at the second high speed finally, the retraction of the seat belt is promptly completed so that it is less likely to cause such a situation that the seat belt is caught by a door when the occupant gets out of the vehicle.

A fourth embodiment for solving the aforementioned problems is the first embodiment and is characterized in that the speed of winding up the seat belt is variable according to the amount of the seat belt is wound up after the release of latching between the buckle and the tongue on the seat belt.

This embodiment can exhibit works and effects obtained by the aforementioned second embodiment.

The fifth embodiment for solving the aforementioned problems is the fourth embodiment and is characterized in that the seat belt is wound up at a first high speed until the seat belt is wound up by a first predetermined amount from the release of latching between the buckle and the tongue on the seat belt, the seat belt is wound up at a low speed until the seat belt is wound up by a second predetermined amount after the first predetermined amount of the seat belt is wound, and the seat belt is wound up at a second high speed until the winding of the seat belt is completed after the second predetermined amount of the seat belt is wound.

This embodiment can exhibit works and effects obtained by the aforementioned third embodiment.

The sixth embodiment for solving the aforementioned problems is the first embodiment and is characterized in that the speed of winding up the seat belt is controlled by voltage to be applied to the motor.

The winding-up speed by the motor may be detected by a speed meter such as a tachogenerator and may be controlled by a speed control unit. However, the speed meter and the speed control unit increase the cost. On the other hand, it is believed that the load of winding up the seat belt is substantially constant so that a substantially constant relationship is established between the voltage applied to the motor and the rotational speed of the motor. Therefore, according to this embodiment, the speed of the motor is varied only by changing the voltage to be applied to the motor without using a speed control unit for the motor.

The seventh embodiment for solving the aforementioned problems is a seat belt device comprising a seat belt retractor of the first embodiment, a seat belt, a tongue, and a buckle.

This embodiment can exhibit works and effects corresponding to the works and effects obtained by the aforementioned first embodiment.

Embodiments of the present invention can provide a seat belt retractor in which the seat belt is less likely to disturb an occupant due to uncompleted winding of the seat belt when the occupant gets out of the vehicle, the seat belt is less likely to be caught by a door when the occupant closes the door after getting off the vehicle, and the tongue is less likely to scratch an interior panel and less likely to generate noise. Embodiments of the present invention can also provide a seat belt device having such a seat belt retractor.

Hereinafter, embodiments of the present invention will be described with reference to the attached drawings. FIG. 1 is a chart showing changes in speed of winding up a seat belt in a seat belt retractor as a first embodiment of the present invention. In this case, a motor of the seat belt retractor is provided with a speed control unit.

As an occupant releases the latching between a buckle and a tongue (buckle release), the seat belt retractor winds up the seat belt at a winding-up speed S1 as a first high speed. Accordingly, the seat belt moves away from the occupant immediately.

As a time period (T1-T0) elapses from the buckle release, the seat belt retractor winds up the seat belt at a winding-up speed S2 as a low speed (actually, the time at which the winding-up speed becomes the winding-up speed S2 is delayed because of inertia as shown in FIG. 1). Accordingly, the seat belt is slowly wound up so that the tongue is less likely to strike and thus scratch an interior panel and is less likely to generate noise.

As a time period (T2-T1) further elapses, the seat belt retractor winds up the seat belt at a winding-up speed S3 as a second high speed. Accordingly, the winding of the seat belt is promptly completed so that the seat belt is less likely to be caught by a door when the occupant gets out of the vehicle.

Figure 2:
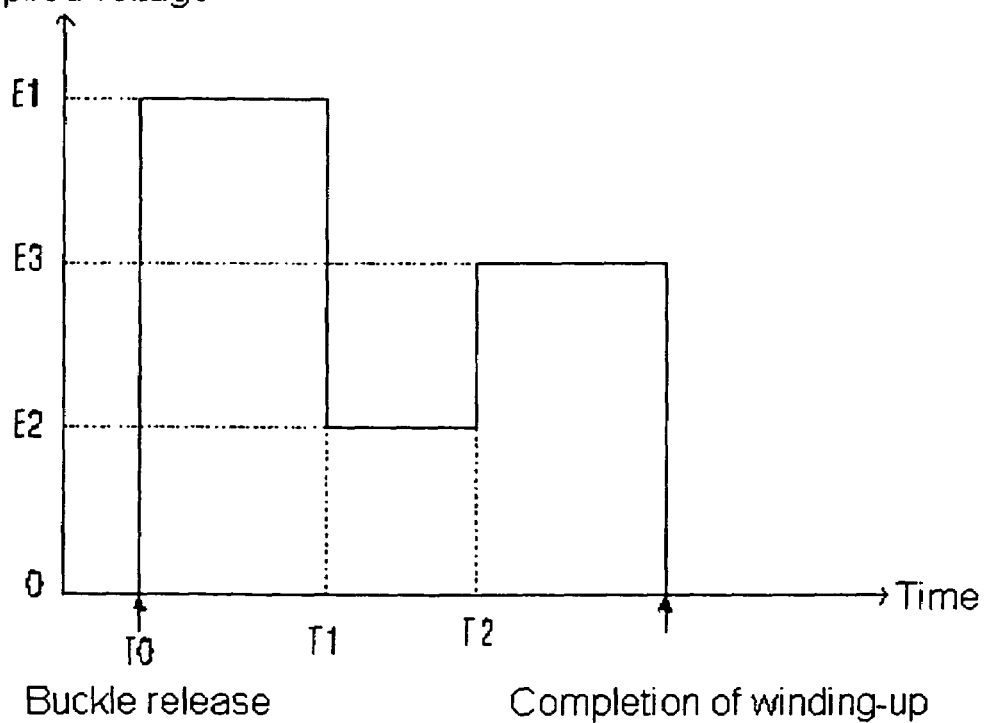
FIG. 2 is a chart showing changes in voltage to be applied to a motor for winding up a seat belt in a seat belt retractor as a second embodiment of the present invention.
Figure 3:
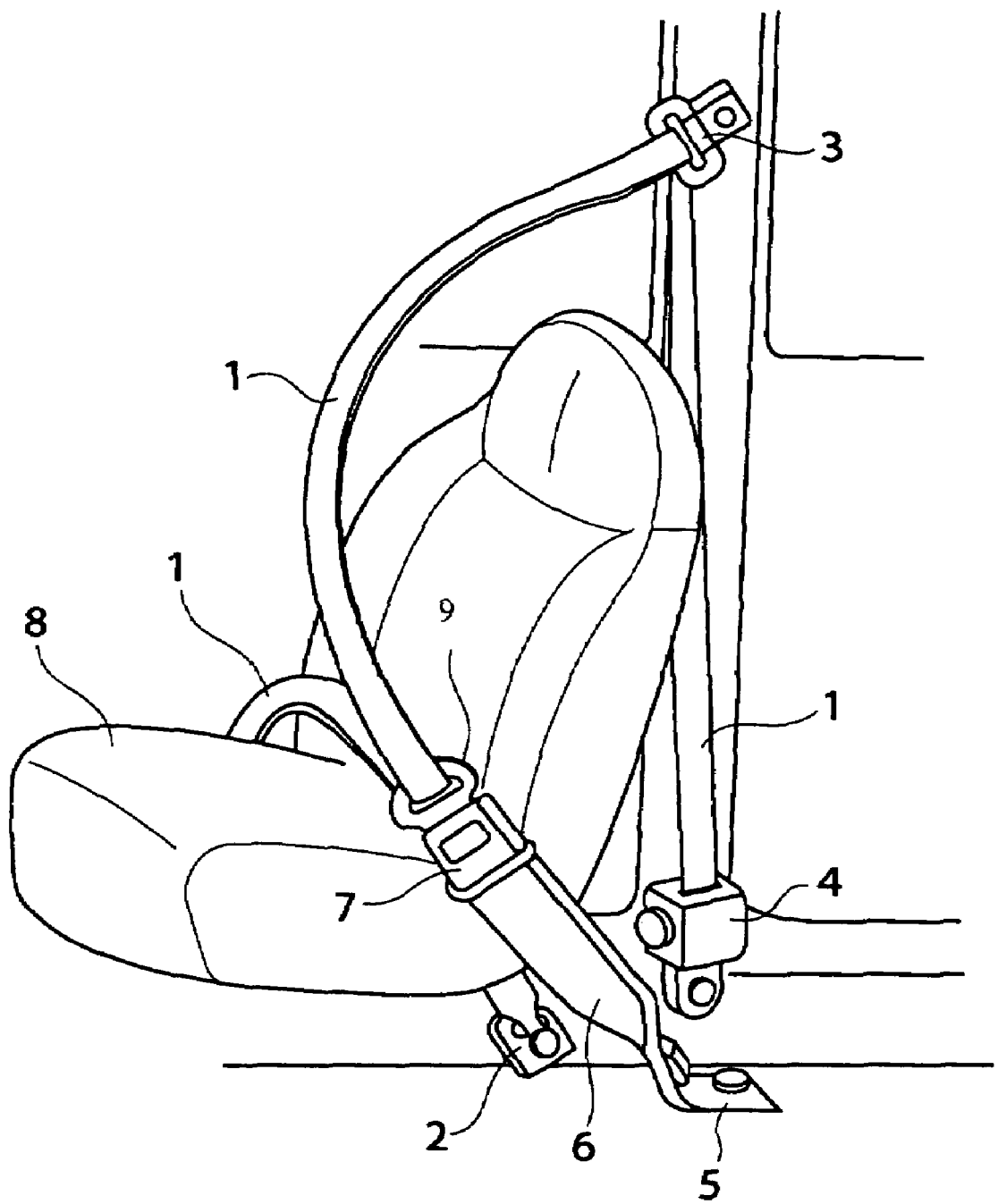

FIG. 2 is a chart showing changes in voltage to be applied to a motor for winding up a seat belt in a seat belt retractor as a second embodiment of the present invention. In this case, the motor of the seat belt retractor is provided with no speed control unit.

When the torque load of the motor is constant, the rotational speed V of the motor depends on the voltage E applied to the motor. Since it is believed that the torque of winding up the seat belt after the release of the latching between the buckle and the tongue is constant, the voltage to be applied to the motor is controlled without controlling the speed of the motor in this embodiment. That is, as the occupant releases the latching between the buckle and the tongue (buckle release), a first high voltage E1 is applied to the motor of the seat belt retractor. Accordingly, the motor rotates at a high speed so that the seat belt moves apart from the occupant immediately.

As a time period (T1-T0) elapses from the buckle release, a constant voltage E2 is applied to the motor of the seat belt retractor. Accordingly, the motor rotates at a low speed and the seat belt is therefore slowly wound up so that the tongue is less likely to strike and thus scratch an interior panel and is less likely to generate noise.

As a time period (T2-T1) further elapses, a second high voltage E3 is applied to the motor of the seat belt retractor. Accordingly, the seat belt is wound up at a high speed and the winding of the seat belt is therefore promptly completed so that the seat belt is less likely to be caught by a door when the occupant gets out of the vehicle.

As the winding by the motor is completed, the load of the motor is increased so that the current flowing in the motor is also increased. By detecting this increase, the voltage is tuned to 0.

In the aforementioned embodiments, the speeds or the voltages may be set such that S1=S3 or E1=E3 and the time periods (T1-T0) and (T2-T1) may be allowed to be varied. By allowing the time periods (T1-T0) and (T2-T1) to be varied, it is capable of adjusting the speed of winding-up the seat belt according to the occupant' size and/or the occupant's taste.

Though time is given on the axis of abscissa in FIG. 1 and FIG. 2, the amount the seat belt is wound up may be given on the axis of abscissa and the winding-up speed or the voltage to be applied to the motor may be changed according to the amount the seat belt is wound up, similar to FIG. 1 and FIG. 2. In this case, T0, T1, T2 are not time; T0 means that the amount of wound seat belt is 0, and T1 and T2 mean respective predetermined amounts of wound seat belt.

Japan Priority Application 2004-292048, filed Oct. 5, 2004, including the specification, drawings, claims and abstract, is incorporated by reference in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A seat belt retractor, comprising:
a motor for winding up a seat belt;
wherein the motor is configured to be controlled so that a speed of winding up the seat belt is varied between different winding speeds;
wherein the motor is configured to be controlled so that the different winding speeds are each produced when a buckle and a tongue on the seat belt are in an unlatched state; and
a control unit configured to control a speed of the motor between a first high speed, a low speed, and a second high speed;
wherein the control unit is configured to control the speed of the motor so that the first high speed, the low speed, and the second high speed are each produced when the tongue and buckle are in an unlatched state.

2. The seat belt retractor according to claim 1, wherein the speed of winding up the seat belt is variable according to a time period elapsing from a release of latching between the buckle and the tongue on the seat belt.

3. The seat belt retractor according to claim 2, wherein, after the buckle and the tongue are in an unlatched state, the seat belt is wound up at a first high speed until a first predetermined time period elapses from the release of latching between the buckle and the tongue on the seat belt, the seat belt is wound up at a low speed until a second predetermined time period elapses after the first predetermined time period, and the seat belt is wound up at a second high speed until the winding of the seat belt is completed after the second predetermined time period.

4. The seat belt retractor according to claim 1, wherein the speed of winding up the seat belt is variable according to an amount of wound seat belt after a release of latching between the buckle and the tongue on the seat belt.

5. The seat belt retractor according to claim 4, wherein, after the buckle and the tongue are in an unlatched state, the seat belt is wound up at a first high speed until the seat belt is wound up by a first predetermined amount from the release of latching between the buckle and the tongue on the seat belt, the seat belt is wound up at a low speed until the seat belt is wound up by a second predetermined amount after the first predetermined amount of the seat belt is wound, and the seat belt is wound up at a second high speed until the winding of the seat belt is completed after the second predetermined amount of the seat belt is wound.

6. The seat belt retractor according to claim 1, wherein the speed of winding up the seat belt is controlled by voltage applied to the motor.

7. A seat belt system, comprising:
a seat belt;
a tongue attached to the seat belt;
a buckle configured to releasably latch with the tongue; and
a seat belt retractor with a motor configured to enable a winding up process of the seat belt, the motor being configured to wind up the seat belt after unlatching of the tongue and the buckle; and
a control unit configured to control a speed of the motor between a first high speed, a low speed, and a second high speed;
wherein the control unit is configured to control the speed of the motor so that the first high speed, the low speed, and the second high speed are each produced when the tongue and buckle are in an unlatched state.

8. The seat belt system according to claim 7, wherein at the first high speed of the motor, the seat belt is configured to immediately wind up and away from an occupant.

9. The seat belt system according to claim 7, wherein at the low speed of the motor, the seat belt is configured to continue winding up at a speed less than the first high speed.

10. The seat belt system according to claim 7, wherein at the second high speed of the motor, the seat belt is configured to complete the winding up process at a speed higher than the low speed and less than the first high speed.

11. The seat belt system according to claim 7, further comprising a speed meter configured to detect a winding-up speed of the motor.

12. The seat belt system according to claim 11, wherein the speed meter comprises a tachogenerator.

13. The seat belt system according to claim 7, wherein the first high speed equals the second high speed.

14. The seat belt system according to claim 7, wherein the speed of the motor is determined by a voltage applied to the motor, and wherein when the buckle and tongue become unlatched, a first high voltage is applied to the motor.

15. The seat belt system according to claim 14, wherein after a first time period, the seat belt system is configured so that a constant low voltage is applied to the motor.

16. The seat belt system according to claim 15, wherein after a second time period, the seat belt system is configured so that a second high voltage is applied to the motor such that the seat belt completes the winding up process.

* * * * *